United States Statutory Invention Registration [19]

[11] Reg. Number: H454

Sickenberger et al. [43] Published: Apr. 5, 1988

[54] CHEMICAL AGENT LEAK DETECTOR AND A METHOD OF USING THE SAME

[75] Inventors: David W. Sickenberger, Baltimore; Richard P. Marcou, Bel Air, both of Md.

[73] Assignee: The United States of America as represented by the Secretary of the Army, Washington, D.C.

[21] Appl. No.: 934,289

[22] Filed: Nov. 17, 1986

Related U.S. Application Data

[63] Continuation of Ser. No. 874,303, Jun. 12, 1986, abandoned.

[51] Int. Cl.[4] ..... G01N 31/00

[52] U.S. Cl. ..... 73/27 R

[58] Field of Search ..... 73/23, 27 R; 338/34; 422/98; 324/71.5; 340/634

[56] References Cited

U.S. PATENT DOCUMENTS

| | | | |
|---|---|---|---|
| 3,979,625 | 9/1976 | Roberts | 73/27 R X |
| 4,011,538 | 3/1977 | Froemel | 73/27 R X |
| 4,369,647 | 1/1983 | Shigemori et al. | 73/27 R |
| 4,410,632 | 10/1983 | Dilley et al. | 73/27 R X |

FOREIGN PATENT DOCUMENTS

| | | | |
|---|---|---|---|
| 82957 | 6/1980 | Japan | 73/23 |

OTHER PUBLICATIONS

Wohltjen, N. L., et al., *Chemical Microsensors for Chemical Vapor Detection;* in Proc. Int. Symp. Protection Against Chemical Warfare Agents, Stockholm, Swe., Jun. 6–19, 1983, pp. 51 and 56–59.

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

A method of detecting leaks within artillery shells, bombs and other munitions is disclosed which involves the permanent in situ insertion within the munition cavity of an electrically resistive surface which varies in resistance with the adsorption thereon of leaking chemical vapors. In a typical embodiment of the invention, the electrically resistive surface is serially connected with an identical surface with an inert coating and the voltage drops across both the coated and uncoated surfaces are measured. Thereby, any changes in the resistance of the exposed surface due to factors other than adsorption thereon of leaking gases, e.g., temperature changes, are appropriately offset.

20 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHEMICAL AGENT LEAK DETECTOR AND A METHOD OF USING THE SAME

GOVERNMENTAL INTEREST

The invention described herein may be manufactured, used and licensed by or for the Government for Governmental purposes without the payment to us of any royalties thereon.

This application is a continuation of application Ser. No. 874,303, filed June 12, 1986, now abandoned.

BACKGROUND AND FIELD OF THE INVENTION

This invention relates to a chemical agent leak detector which adsorbs the vapor of the leaking chemical munition and upon so doing undergoes a change in its electrical resistance according to a known correlation.

A need exists to monitor chemical agent munitions to determine if these munitions are leaking and thus represent a potentially dangerous situation. Presently the identification of defective munitions requires an operator to open an access to the munition and to place a sampling device within the munition cavity. The sampling devices presently being used are glass tubes containing reactive chemicals which produce a colorimetric change in the presence of chemical agent vapors. The operator must draw a vapor sample from within the munition, either manually with a hand pump or with an external vacuum pump, into the detector tube. After the sample is removed, the operator visually checks for any color change and recaps the access plug.

The use of such detector tubes is unsatisfactory for many reasons. First, it requires the operator to generate an access to the munition cavity each time the munition is analyzed which is an inconvenience and a hazard in its own right. Second, this exposes the operator to potential chemical contamination. Third, since the detection tubes utilize chemical reagents which in turn have a limited life span, such detector tubes must be periodically replaced. Fourth, a cost is incurred due to the need to maintain a functional inventory of such tubes. Fifth, this type of analysis is manpower intensive.

SUMMARY OF THE INVENTION

This invention provides a quick, reusable and inexpensive means to make a determination as to whether any munition is leaking without any of the above disadvantages and without causing any modifications to the munitions to be undertaken. The invention involves the permanent placement within a munition shell of an electrical resistor which may also be termed a conductor which is capable of adsorbing leaking chemical vapors onto its surface whereby it undergoes a change in its electrical resistivity in a known manner as a function of the vapor pressure of the leaking chemical agent. A measurement of such change of resistance enables the operator to determine if the munition is leaking. In order to eliminate temperature dependence of the resistor, the exposed resistor is connected in series with a resistor which is protected with a coating of a non-adsorbing and inert substance such as glass or teflon. After adsorption equilibrium is reached on the exposed resistor, any difference in resistance (as measured by the application of a direct current) of the two serially connected resistors enables a ready determination to be made as to whether the munition is leaking. The exposed resistor is freed of adsorbed chemicals by applying an alternating current thereacross.

Thus, it will be seen that in the use of this invention, unlike the case with the old method described above, it is not necessary for the operator to gain routine access into the munition cavity. Once the chemical agent leak detector of this invention is placed inside a munition cavity, it stays in place. Thus, the risk of operator contamination is greatly decreased if not eliminated altogether. Moreover, the bomb leak detector of this invention has an indefinite life span. Furthermore, this invention makes it possible to utlize the same device to be used repeatedly to monitor the same munition. Additionally, the use of this invention permits the entire analysis to be made very quickly because it is electronic in nature, thereby reducing manpower needs. To list yet another advantage, it should also be noted that since the operator does not need to make a visual determination of a color change, the use of this invention permits the operator to perform the required analysis even with limited available light.

OBJECTS OF THE INVENTION

These and other objects and advantages will become apparent to any person of ordinary skill in the art to which this invention pertains upon further reading this specification:

An object of this invention is to provide a chemical vapor leak detector which comprises an exposed electrically conductive surface of a known resistance capable of adsorbing thereon said chemical vapor wherein the resistance of said electrically conductive surface varies in a known manner with the amount of chemical vapor adsorbed thereon.

Another object of this invention is to provide a process of measuring or ascertaining the fact of chemical leakage which comprises the steps of: inserting the chemical vapor leak detector described in the immediately preceding paragraph within an area of suspected chemical contamination; adsorbing any contaminating chemical vapors present in said area of suspected chemical contamination to a point of equilibrium; and measuring any resulting change in electrical resistance of the chemical vapor leak detector by the application of a direct current thereacross.

A still further object of this invention is to provide a chemical vapor leak detector which comprises an exposed electrical conductive surface of a known resistance in electrical contact with another identical electrically conductive surface of identical area separated from said chemical vapor by being disposed within a protective envelope wherein the resistance of said electrically conductive surface varies in a known manner with the amount of the chemical vapor adsorbed thereon.

In yet another object, this invention is to provide a method of measuring chemical leakage which comprises the steps of: inserting the chemical vapor leak detector described in the immediately preceding paragraph wittin an area of suspected chemical contamination; adsorbing onto the exposed electrically conductive surface any contaminating chemical vapors present in said area of suspected chemical contamination to a point of equilibrium; and measuring any resulting differential in electrical resistance between the exposed electrically conductive surface and the electrically conductive surface disposed within a protective envelope by the application of a direct currect sequentially across the exposed electrically conductive surface, the electrical contact and the electrically conductive surface disposed within a protective envelope.

LIST OF FIGURES

A reference to the accompanying drawings which are meant to be illustrative but not limiting will aid in a further understanding of the present invention:

FIG. 1(*b*) shows an end view of the sensor shown in FIGS. 1A; and

DETAILED DESCRIPTION OF THE INVENTION

Figure 1A:
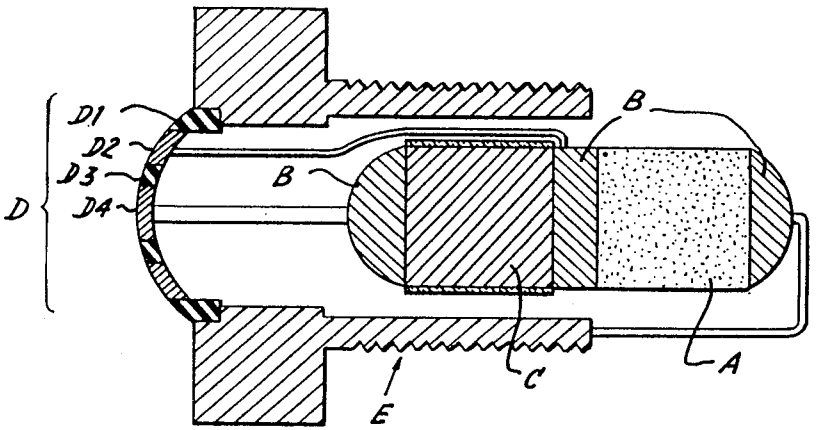
FIG. 1(*a*) shows a cross-sectional view of a sensor according to this invention.
Figure 1B:
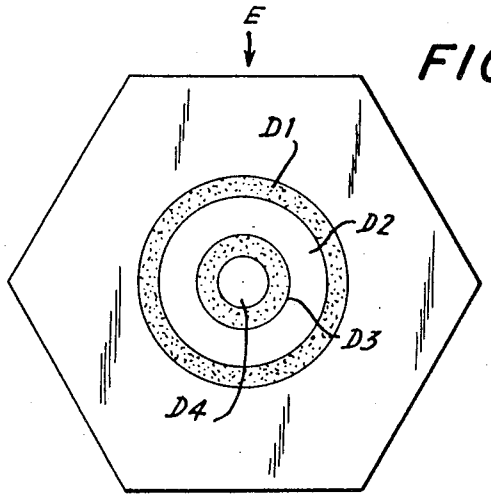

The chemical agent leak detector of the present invention comprises the sensor shown in FIGS. 1(*a*) and 1(*b*). The sensor is inserted into the munition. In fact, a sensor is inserted into each munition which is to be monitored.

The detection of leaking chemical agents at the sensor is based on the adsorption of vapors onto a device known as an ADSISTOR (ADsorption Sensitive resISTOR). Typically, though not necessarily an ADSISTOR consists of carbon. Upon such adsorption these devices change resistance in a manner related to the concentration of the gas vapor (i.e., its partial vapor pressure) and the interaction characteristics peculiar to that ADSISTOR and that vapor which are involved. Known empirical data indicate that the percentage change in resistance is related to the vapor pressure of the leaking chemical munition.

In FIG. 1(*a*), the actual area for this adsorption is identified by item A. The metallic sleeves or bands (e.g., copper, silver or aluminum) indicated as item B provide electrical contact to this surface and also provide a physical means to attach electrical leads. The resistance change is measured across these leads.

FIGS. 1(*a*) and 1(*b*) show the chemical vapor leak detector of this invention in third argle projection.

In order to eliminate undesired resistance changes due to temperature effects, the ADSISTOR design incorporates two types of sensing surfaces. In addition to the adsorption surface as described above, a temperature compensation surface is also provided. The temperature sensing surface (item C) is of the same basic design as that of the vapor sensor portion except that it is coated with a ceramic (e.g., glass) or a polymeric (e.g., teflon) coating to prohibit adsorption. This feature provides a means for direct temperature effect subtraction and thus provides a means to measure the relative resistance change (which is all that matters) without bringing into play the nominal resistance of the exposed ADSISTOR sensor. The two surfaces need not have the same area: however, the comparison is most direct and most easily understood when the two surfaces have the same area. The percent resistance change is determined by measuring the relative resistance changes across the protected and unprotected sensor areas using the bulkhead electrical contacts (item D). A single electronic monitoring device can be used for any number of sensors regardless of their nominal resistance values because of this design. Item D is comprised of insulators (D1 and D3) and metal contacts (D2 and D4).

In military munition leak applications, the sensor is mounted on standard pipe fittings (item E) and screwed into available fittings which exist on the munition. For example, a sensor mounted on a one-eighth inch fitting would replace the standared one-eighth inch vent cap plug on such munitions as bombs and rockets. In the event of an internal leak within the munition, a corrresponding agent vapor is developed within the cavity. The sensor in turn produces a resistance imbalance between the protected and unprotected surfaces. The imbalance is then determined by measuring the relative resistances on the three contact points located on the bulkhead of the chemical vapor leak detector of this invention. Specifically, the resistance between the inner and mid contacts and that between the mid and outer contacts is measured.

The respective resistances, the changes therein and the ratio of the resistance between the protected and unprotected surfaces are all measured using known electronic means. The same electronic means is also used, when necessary, to apply an alternating current across only the unprotected surface or across both the protected and unprotected surfaces through the connecting metallic sleeve (whatever is convenient) until any adsorbed chemical vapor is dislodged from the exposed surface. This cleaning operation involving the use of alternating current becomes necessary in the event that a previously used ADSISTOR is used again or when it has become accidentally contaminated with solvents during the process of installation.

Figure 2:
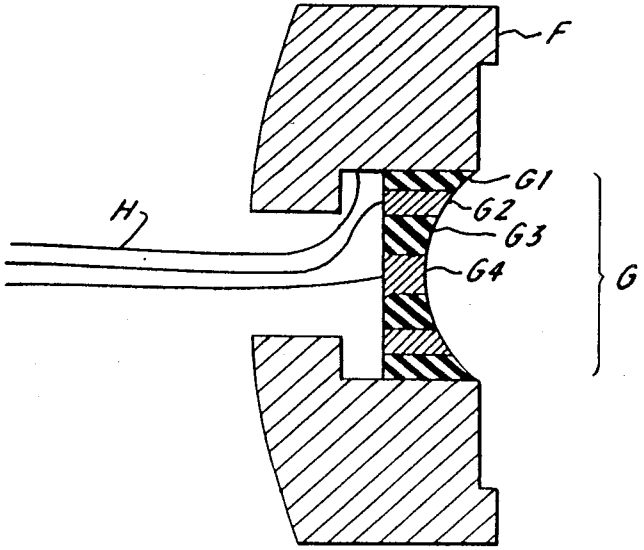
FIG. 2 shows a sensor contact, for use with the equipment shown in FIGS. 1A and 1B

The necessary electrical contact between the bulkhead of the chemical vapor leak detector of this invention and a handheld electronic monitoring device is made by the use of the mating connector or sensor contact shown in FIG. 2. The detector bulkhead and the sensor contact as shown in the accompanying drawings are in a male/female orientation respectively. There is, of course, no reason why this order cannot be reversed.

The sensor contact shown in FIG. 2 consists of a metal outer contact (item F) and inner contacts (item G). Item G is made of insulator components (G1 and G3) with metal contacts (G2 and G4). The contacts are electrically fed from the sensor contact back to the monitor via a series of wires (item H).

When the monitor is used in the sensor (as opposed to the cleansing) mode, the monitor measures the voltage distribution across the coated and uncoated sensing elements. If a voltage is applied across both elements and the sensing element has increased resistance due to adsorption, the voltage drop across the sensing element will increase thereby indicating that the munition is leaking.

The coated and uncoated sensor elements shown in the accompanying drawings are in the shape of the curvilinear surface of a cylinder. In practice any other shape (e.g., triangular, square, etc. in cross-section) is equally satisfatory. Indeed, the respective elements do not even need to have a rectilinear axis.

The scope of the present invention is further defined by and should be read in conjunction with the appended claims.

What is claimed is;

1. A chemical vapor leak detector which comprises: an electric current source, selectively connected to feed a current through an exposed electrically conductive surface of a known resistance capable of adsorbing thereon said chemical vapor, wherein the resistance of said electrically conductive surface varies in a known manner with the amount of chemical vapor adsorbed thereon, and wherein said resistance variation is capable of measurement by observing voltage drop across said electrically conductive surface when said current is selectively fed therethrough.

2. The chemical vapor leak detector of claim 1 wherein said electrically conductive surface is in the shape of the curvilinear portion of a cylinder.

3. The chemical vapor leak detector of claim 1 wherein said electrically conductive surface comprises of carbon.

4. A method of measuring chemical leakage which comprises the steps of:

(a) inserting the chemical vapor leak detector of claim 1 within an area of suspected chemical contamination;

(b) adsorbing any contaminating chemical vapors present in said area of suspected chemical contamination to a point of equilibrium; and (c) measuring any resulting change in electrical resistance of the chemical vapor leak detector by the application of a direct current therethrough.

5. The method of claim 4 wherein the area of suspected chemical contamination is a cavity inside a chemical munition.

6. A method of freeing the electrically conductive surface of the chemical vapor leak detector of claim 1 of any adsorbed chemical vapors which comprises the step of applying an alternating current thereacross.

7. A chemical vapor leak detector which comprises an exposed first electrically conductive surface of a known resistance in electrical contact with a second identical electrically conductive surface of identical area separated from said chemical vapor by being disposed within a protective envelope wherein the resistance of said first electrically conductive surface varies in a known manner with the amount of chemical vapor adsorbed thereon.

8. The chemical vapor leak detector of claim 7 wherein said electrically conductive surfaces are identical in shape to each other.

9. The chemical vapor leak detector of claim 8 wherein the shape of the electrically conductive surfaces is the curvilinear portion of a cylinder.

10. The chemical vapor leak detector of claim 7 wherein said electrically conductive surfaces comprises of carbon.

11. The chemical vapor leak detector of claim 7 wherein the protective envelope comprises a ceramic material.

12. The chemical vapor leak detector of claim 11 wherein the ceramic material comprises glass.

13. The chemical vapor leak detector of claim 7 wherein the protective envelope comprises a polymeric material.

14. The chemical vapor leak detector of claim 13 wherein the polymeric material comprises Teflon® plastic material.

15. The chemical vapor leak detector of claim 7 wherein the electrical contact comprises a metallic sleeve.

16. The chemical vapor leak detector of claim 15 wherein the metallic sleeve is made of a metal selected from the group consisting of copper, silver and aluminum.

17. A method of measuring chemical leakage which comprises the steps of:

(a) inserting the chemical vapor leak detector of claim 7 within an area of suspected chemical contamination;

(b) adsorbing onto the exposed electrically conductive surface any contaminating chemical vapors present in said area of suspected chemical contamination to a point of equilibrium; and (c) measuring any resulting differential in electrial resistance between the exposed electrically conductive surface and the electrically conductive surface disposed within a protective envelope by the application of a direct current sequentially across the exposed electrically conductive surface, the electrical contact and the electrically conductive surface disposed within a protective envelope.

18. The method of claim 17 wherein the area of suspected chemical contamination is a cavity inside chemical munitions.

19. A method of freeing the exposed electrically conductive surface of the chemical vapor leak detector of claim 7 of any adsorbed chemical vapors which comprises the step of applying an alternating current sequentially across the exposed electrically conductive surface, the electrical contact and the electrically conductive surface disposed within a protective envelope.

20. The method of freeing the exposed electrically conductive surface of the chemical vapor leak detector of claim 7 of any adsorbed chemical vapors which comprises the step of applying an alternating current therethrough.

* * * * *